United States Patent
Yildiz et al.

(10) Patent No.: US 10,810,773 B2
(45) Date of Patent: Oct. 20, 2020

(54) HEADSET DISPLAY CONTROL BASED UPON A USER'S PUPIL STATE

(71) Applicant: Dell Products, L.P., Round Rock, TX (US)

(72) Inventors: Yagiz Can Yildiz, Austin, TX (US); Rex W. Bryan, Round Rock, TX (US)

(73) Assignee: Dell Products, L.P., Round Rock, TX (US)

( * ) Notice: Subject to any disclaimer, the term of this patent is extended or adjusted under 35 U.S.C. 154(b) by 0 days.

(21) Appl. No.: 15/623,002

(22) Filed: Jun. 14, 2017

(65) Prior Publication Data

US 2018/0365875 A1    Dec. 20, 2018

(51) Int. Cl.
| | |
|---|---|
| *G06T 11/60* | (2006.01) |
| *G06T 11/00* | (2006.01) |
| *G06K 9/00* | (2006.01) |
| *G06F 3/00* | (2006.01) |
| *G02B 27/01* | (2006.01) |

(52) U.S. Cl.
CPC .......... *G06T 11/60* (2013.01); *G02B 27/0172* (2013.01); *G06F 3/005* (2013.01); *G06K 9/0061* (2013.01); *G06K 9/00604* (2013.01); *G06T 11/001* (2013.01); *G02B 2027/0118* (2013.01); *G02B 2027/0138* (2013.01)

(58) Field of Classification Search
CPC ....... G06T 11/001; G06T 11/60; G06T 19/00; G06T 19/003; G06T 19/006; G06K 9/0061; G06K 9/00604; G06F 3/005; G02B 27/0172; G02B 2027/0118; G02B 2027/0138
See application file for complete search history.

(56) References Cited

U.S. PATENT DOCUMENTS

| | | | | |
|---|---|---|---|---|
| 6,011,580 A * | 1/2000 | Hattori | ................. | G02B 27/225 348/57 |
| 6,116,736 A * | 9/2000 | Stark | ...................... | A61B 3/112 351/206 |
| 6,198,484 B1 * | 3/2001 | Kameyama | ............. | G06T 15/10 345/419 |
| 6,247,813 B1 * | 6/2001 | Kim | ................... | G06K 9/00597 351/206 |
| 6,260,968 B1 * | 7/2001 | Stark | ...................... | A61B 3/112 351/205 |
| 6,304,234 B1 * | 10/2001 | Horiuchi | .............. | G02B 27/017 345/1.3 |
| 6,791,584 B1 * | 9/2004 | Xie | ........................ | G06Q 30/02 351/204 |

(Continued)

*Primary Examiner* — Charles L Beard
(74) *Attorney, Agent, or Firm* — Fogarty LLP (57) ABSTRACT

Systems and methods for display control based on pupil size in virtual, augmented, and mixed reality (xR) applications. In some embodiments, a method may include: identifying, via a camera mounted to a body a headset facing an eye of a user wearing the headset, a pupil state of the user; communicating an indication of the pupil state to an Information Handling System (IHS) coupled to the headset, wherein the IHS is configured to select a setting based upon the pupil state and transmit an indication of the setting to the headset; and applying the setting, via a controller of the headset, to at least one of: (a) a display mounted on the body of the headset, or (b) an image shown to the user via the display.

17 Claims, 6 Drawing Sheets

(56) References Cited

U.S. PATENT DOCUMENTS

| | | | |
|---|---|---|---|
| 7,277,561 B2* | 10/2007 | Shin | G06K 9/00597 382/117 |
| 7,554,541 B2* | 6/2009 | Fitzmaurice | G02B 27/2271 345/424 |
| 7,744,216 B1* | 6/2010 | Uhlhorn | G09G 5/00 351/204 |
| 8,305,297 B2* | 11/2012 | Sugihara | G02B 27/0172 345/8 |
| 8,885,882 B1* | 11/2014 | Yin | G06F 3/00 382/103 |
| 8,990,682 B1* | 3/2015 | Wong | G02B 27/017 715/254 |
| 9,443,343 B2* | 9/2016 | Rhee | G06T 15/04 |
| 9,479,730 B1* | 10/2016 | Noll | G06F 16/9038 |
| 9,599,825 B1* | 3/2017 | Mullins | G02B 27/0179 |
| 9,600,069 B2* | 3/2017 | Publicover | G06F 3/013 |
| 9,613,592 B2* | 4/2017 | Kobayashi | G09G 5/10 |
| 9,629,976 B1* | 4/2017 | Acton | A61B 5/486 |
| 9,709,807 B2* | 7/2017 | Blanco | G02B 27/0172 |
| 9,727,134 B2* | 8/2017 | Aurongzeb | G06F 3/013 |
| 9,812,053 B2* | 11/2017 | Knepper | G09G 3/2003 |
| 9,823,473 B2* | 11/2017 | Kobayashi | G02B 27/017 |
| 9,956,962 B2* | 5/2018 | Wacker | A61B 5/18 |
| 10,073,201 B2* | 9/2018 | Ma | G02B 27/0172 |
| 10,175,490 B1* | 1/2019 | Serdarevic | G02B 27/0172 |
| 10,380,420 B2* | 8/2019 | Chien | G06F 3/147 |
| 10,403,047 B1* | 9/2019 | Comer | G06F 3/012 |
| 10,403,231 B2* | 9/2019 | Lee | G06K 9/00604 |
| 10,437,325 B2* | 10/2019 | Le Gros | G06K 9/0061 |
| 10,444,514 B2* | 10/2019 | Abou Shousha | A61B 3/0091 |
| 10,445,925 B2* | 10/2019 | Tokubo | A63F 13/30 |
| 10,475,415 B1* | 11/2019 | Gatson | G09G 3/003 |
| 10,482,677 B1* | 11/2019 | Iyer | G06F 3/04815 |
| 10,503,250 B2* | 12/2019 | Martensson | G06K 9/0061 |
| 10,540,812 B1* | 1/2020 | Yildiz | G06T 19/20 |
| 10,545,336 B2* | 1/2020 | Dubey | G09G 3/3225 |
| 10,552,690 B2* | 2/2020 | Schubert | G08G 1/165 |
| 10,593,126 B2* | 3/2020 | Ishiguro | G06T 19/20 |
| 2003/0038832 A1* | 2/2003 | Sobol | G06T 11/60 715/722 |
| 2003/0043470 A1* | 3/2003 | Harter, Jr. | G02B 27/01 359/630 |
| 2003/0147635 A1* | 8/2003 | Jung | H04N 5/9206 386/230 |
| 2003/0156078 A1* | 8/2003 | Iwase | G10H 1/0066 345/30 |
| 2004/0212776 A1* | 10/2004 | Spitzer | G02B 27/0081 351/41 |
| 2006/0077344 A1* | 4/2006 | Kashiwagi | A61B 3/15 351/206 |
| 2006/0146518 A1* | 7/2006 | Dubin | G02B 6/0008 362/106 |
| 2006/0147094 A1* | 7/2006 | Yoo | G06K 9/0061 382/117 |
| 2006/0210146 A1* | 9/2006 | Gu | G01B 11/25 382/154 |
| 2006/0221266 A1* | 10/2006 | Kato | G02B 27/017 348/838 |
| 2007/0098259 A1* | 5/2007 | Shah | G06F 17/30262 382/165 |
| 2007/0132663 A1* | 6/2007 | Iba | G06F 3/013 345/8 |
| 2007/0206119 A1* | 9/2007 | Matsui | H04N 5/46 348/557 |
| 2007/0211267 A1* | 9/2007 | Pellar | H04N 1/40 358/1.9 |
| 2007/0236737 A1* | 10/2007 | Pellar | H04N 1/40012 358/3.01 |
| 2007/0247524 A1* | 10/2007 | Yoshinaga | G06K 9/0061 348/78 |
| 2008/0025629 A1* | 1/2008 | Obrador | G06K 9/342 382/256 |
| 2008/0042555 A1* | 2/2008 | Ko | G02F 1/133603 313/503 |
| 2008/0069410 A1* | 3/2008 | Ko | G06K 9/0061 382/117 |
| 2008/0139082 A1* | 6/2008 | Schnuckle | A63H 3/38 446/392 |
| 2008/0246843 A1* | 10/2008 | Nagata | B60R 1/00 348/148 |
| 2009/0109400 A1* | 4/2009 | Yoshinaga | A61B 3/113 351/210 |
| 2009/0232357 A1* | 9/2009 | Angell | G06K 9/00771 382/103 |
| 2009/0273687 A1* | 11/2009 | Tsukizawa | G06F 3/012 348/222.1 |
| 2010/0085539 A1* | 4/2010 | Harada | A61B 3/112 351/206 |
| 2010/0205043 A1* | 8/2010 | Edwards | G06Q 30/0201 705/7.29 |
| 2011/0032441 A1* | 2/2011 | Robinson | G02F 1/133621 349/33 |
| 2011/0080421 A1* | 4/2011 | Capener | G09G 5/10 345/589 |
| 2011/0134091 A1* | 6/2011 | Chen | G09G 3/3406 345/207 |
| 2011/0157489 A1* | 6/2011 | Ichioka | G09G 3/3426 348/790 |
| 2011/0181541 A1* | 7/2011 | Kuo | G06F 1/1686 345/174 |
| 2011/0234476 A1* | 9/2011 | Sugihara | G02B 27/0172 345/8 |
| 2011/0316850 A1* | 12/2011 | Chen | G09G 3/003 345/419 |
| 2012/0019703 A1* | 1/2012 | Thorn | G06T 5/002 348/333.03 |
| 2012/0154277 A1* | 6/2012 | Bar-Zeev | G02B 27/017 345/158 |
| 2012/0237121 A1* | 9/2012 | Kuboyama | H04N 1/40012 382/163 |
| 2012/0242560 A1* | 9/2012 | Nakada | G09G 3/3406 345/8 |
| 2012/0320038 A1* | 12/2012 | Harada | H04N 13/0022 345/419 |
| 2013/0021373 A1* | 1/2013 | Vaught | G02B 27/017 345/633 |
| 2013/0050258 A1* | 2/2013 | Liu | G02B 27/017 345/633 |
| 2013/0057573 A1* | 3/2013 | Chakravarthula | G06F 3/005 345/619 |
| 2013/0083007 A1* | 4/2013 | Geisner | G06T 19/006 345/419 |
| 2013/0083008 A1* | 4/2013 | Geisner | G06T 19/006 345/419 |
| 2013/0083062 A1* | 4/2013 | Geisner | G02B 27/017 345/633 |
| 2013/0108165 A1* | 5/2013 | Ptucha | G06T 11/60 382/195 |
| 2013/0108166 A1* | 5/2013 | Ptucha | G06T 11/60 382/195 |
| 2013/0108168 A1* | 5/2013 | Ptucha | G06F 17/30259 382/195 |
| 2013/0136304 A1* | 5/2013 | Anabuki | G06K 9/00362 382/103 |
| 2013/0170022 A1* | 7/2013 | Caldeira | G02B 7/28 359/379 |
| 2013/0216136 A1* | 8/2013 | Kita | G06K 9/46 382/195 |
| 2013/0243251 A1* | 9/2013 | Nakashima | G06K 9/0061 382/103 |
| 2013/0321265 A1* | 12/2013 | Bychkov | G06F 3/013 345/156 |
| 2014/0006326 A1* | 1/2014 | Bazanov | G06Q 10/103 706/46 |
| 2014/0019005 A1* | 1/2014 | Lee | G02B 27/01 701/36 |
| 2014/0062865 A1* | 3/2014 | Fateh | G06T 11/206 345/156 |

(56) References Cited

U.S. PATENT DOCUMENTS

| | | | |
|---|---|---|---|
| 2014/0068109 A1* | 3/2014 | Stark | G06F 9/467 710/5 |
| 2014/0098133 A1* | 4/2014 | Fein | G06T 11/60 345/633 |
| 2014/0104143 A1* | 4/2014 | Benson | G09G 5/00 345/8 |
| 2014/0104692 A1* | 4/2014 | Bickerstaff | G02B 27/017 359/630 |
| 2014/0108309 A1* | 4/2014 | Frank | G06Q 10/00 706/12 |
| 2014/0108842 A1* | 4/2014 | Frank | G06F 17/28 713/323 |
| 2014/0125558 A1* | 5/2014 | Miyajima | G06F 17/289 345/8 |
| 2014/0128144 A1* | 5/2014 | Bavitz | A63F 9/24 463/23 |
| 2014/0149177 A1* | 5/2014 | Frank | G06Q 10/06 705/7.29 |
| 2014/0177023 A1* | 6/2014 | Gao | G02B 5/04 359/238 |
| 2014/0181106 A1* | 6/2014 | Horowitz | G06F 3/013 707/737 |
| 2014/0184775 A1* | 7/2014 | Drake | A61B 3/14 348/78 |
| 2014/0219558 A1* | 8/2014 | Teng | G06T 9/00 382/166 |
| 2014/0285403 A1* | 9/2014 | Kobayashi | G02B 27/017 345/8 |
| 2014/0313484 A1* | 10/2014 | Bogaert | A61B 3/0025 351/211 |
| 2014/0324922 A1* | 10/2014 | Edelstein | G06F 21/10 707/812 |
| 2014/0354514 A1* | 12/2014 | Aronsson | G06F 3/013 345/7 |
| 2014/0361984 A1* | 12/2014 | Kim | G06F 3/013 345/156 |
| 2014/0376877 A1* | 12/2014 | Nozaki | H04N 5/915 386/230 |
| 2015/0015460 A1* | 1/2015 | Kobayashi | G09G 5/10 345/8 |
| 2015/0049004 A1* | 2/2015 | Deering | G02B 27/0172 345/8 |
| 2015/0070389 A1* | 3/2015 | Goto | G06T 7/00 345/633 |
| 2015/0116364 A1* | 4/2015 | Aurongzeb | G06F 3/0487 345/659 |
| 2015/0130703 A1* | 5/2015 | Ghajar | G06F 3/013 345/156 |
| 2015/0138070 A1* | 5/2015 | Iwatsu | G02B 27/017 345/156 |
| 2015/0153810 A1* | 6/2015 | Sasidharan | G06F 1/3212 713/320 |
| 2015/0154445 A1* | 6/2015 | Biswas | G06K 9/00604 345/2.3 |
| 2015/0161213 A1* | 6/2015 | Raichelgauz | G06F 16/41 707/769 |
| 2015/0177831 A1* | 6/2015 | Chan | G06F 3/013 345/156 |
| 2015/0178592 A1* | 6/2015 | Ratcliff | H04N 5/23222 382/155 |
| 2015/0187330 A1* | 7/2015 | Yang | G09G 5/10 345/690 |
| 2015/0203036 A1* | 7/2015 | Kajiwara | G08G 1/166 345/7 |
| 2015/0213725 A1* | 7/2015 | Huntley | A61B 5/168 345/156 |
| 2015/0232030 A1* | 8/2015 | Bongwald | B60R 1/00 348/115 |
| 2015/0254508 A1* | 9/2015 | Kimura | G06K 9/00604 382/117 |
| 2015/0254905 A1* | 9/2015 | Ramsby | G06T 19/006 345/419 |
| 2015/0269907 A1* | 9/2015 | Hadas | G09G 5/363 345/589 |
| 2015/0278599 A1* | 10/2015 | Zhang | G06K 9/00604 348/78 |
| 2015/0288944 A1* | 10/2015 | Nistico | G02B 27/0172 345/156 |
| 2015/0301597 A1* | 10/2015 | Rogers | G06Q 30/00 345/156 |
| 2015/0302426 A1* | 10/2015 | Rogers | G06Q 30/0201 705/7.29 |
| 2015/0309568 A1* | 10/2015 | Miki | G06F 3/013 345/173 |
| 2015/0316765 A1* | 11/2015 | Kim | H04N 5/247 345/7 |
| 2015/0326570 A1* | 11/2015 | Publicover | G06F 21/64 726/4 |
| 2015/0332166 A1* | 11/2015 | Ferens | G06N 20/00 706/11 |
| 2015/0338915 A1* | 11/2015 | Publicover | G06F 21/64 345/633 |
| 2015/0348322 A1* | 12/2015 | Ligameri | G06F 3/013 345/633 |
| 2015/0363978 A1* | 12/2015 | Maimone | G02B 27/0172 345/633 |
| 2016/0012475 A1* | 1/2016 | Liu | G06F 3/013 705/14.49 |
| 2016/0018655 A1* | 1/2016 | Imoto | G06F 3/011 345/8 |
| 2016/0054565 A1* | 2/2016 | Izumihara | G02B 27/017 345/8 |
| 2016/0057410 A1* | 2/2016 | Huang | G02B 27/2264 348/53 |
| 2016/0063761 A1* | 3/2016 | Sisbot | B60W 50/14 345/633 |
| 2016/0065903 A1* | 3/2016 | Wang | B60R 11/04 |
| 2016/0065978 A1* | 3/2016 | Hiwatashi | H04N 19/31 375/240.02 |
| 2016/0080720 A1* | 3/2016 | Fullam | A61B 3/00 345/156 |
| 2016/0152179 A1* | 6/2016 | Gauld | G06K 9/00604 315/155 |
| 2016/0167672 A1* | 6/2016 | Krueger | H04N 13/366 340/576 |
| 2016/0170998 A1* | 6/2016 | Frank | G06F 16/24578 707/748 |
| 2016/0171514 A1* | 6/2016 | Frank | G06F 16/337 705/7.29 |
| 2016/0180801 A1* | 6/2016 | Lee | H04M 1/72569 345/156 |
| 2016/0187976 A1* | 6/2016 | Levesque | G06F 3/016 705/14.4 |
| 2016/0192837 A1* | 7/2016 | Neice | A61B 3/0025 351/206 |
| 2016/0224803 A1* | 8/2016 | Frank | G06F 21/6245 |
| 2016/0225189 A1* | 8/2016 | Nishizawa | G06F 3/011 |
| 2016/0227113 A1* | 8/2016 | Horesh | G03B 15/03 |
| 2016/0231573 A1* | 8/2016 | Mullins | H05B 37/0218 |
| 2016/0247257 A1* | 8/2016 | Cheung | G06T 5/50 |
| 2016/0259985 A1* | 9/2016 | Hanna | G06T 7/521 |
| 2016/0260143 A1* | 9/2016 | Ekambaram | G06K 9/00302 |
| 2016/0261905 A1* | 9/2016 | Aruga | H04L 41/0806 |
| 2016/0274848 A1* | 9/2016 | Suzuki | H04N 1/00456 |
| 2016/0275067 A1* | 9/2016 | Mei | G06F 17/248 |
| 2016/0275649 A1* | 9/2016 | Yang | G06F 3/0487 |
| 2016/0283483 A1* | 9/2016 | Jiang | G06F 17/3053 |
| 2016/0284129 A1* | 9/2016 | Nishizawa | G06F 3/013 |
| 2016/0294839 A1* | 10/2016 | Walline | H04L 63/105 |
| 2016/0295605 A1* | 10/2016 | Walline | H04W 12/06 |
| 2016/0299354 A1* | 10/2016 | Shtukater | G02C 7/04 |
| 2016/0299569 A1* | 10/2016 | Fisher | G02B 27/017 |
| 2016/0302663 A1* | 10/2016 | Fayolle | A61B 3/113 |
| 2016/0313890 A1* | 10/2016 | Walline | G06F 3/04812 |
| 2016/0334868 A1* | 11/2016 | Pacheco | G06F 3/013 |
| 2016/0350826 A1* | 12/2016 | Glasgow | G06Q 30/0619 |
| 2016/0359833 A1* | 12/2016 | An | G06K 9/22 |
| 2016/0364625 A1* | 12/2016 | Lin | G06T 7/60 |
| 2016/0366317 A1* | 12/2016 | Ivanisov | G06K 9/00604 |

(56) References Cited

U.S. PATENT DOCUMENTS

| | | | |
|---|---|---|---|
| 2016/0378084 A1* | 12/2016 | Park | H04L 12/283 |
| | | | 700/275 |
| 2016/0379498 A1* | 12/2016 | Aoki | G08G 1/166 |
| | | | 340/436 |
| 2017/0000344 A1* | 1/2017 | Visconti | A61B 5/16 |
| 2017/0011540 A1* | 1/2017 | Bauchspies | G06K 9/00013 |
| 2017/0018065 A1* | 1/2017 | Greenway, Jr. | G06T 7/0002 |
| 2017/0038595 A1* | 2/2017 | Kutomi | G02B 27/01 |
| 2017/0039423 A1* | 2/2017 | Cork | G06K 9/00671 |
| 2017/0039894 A1* | 2/2017 | Kirchhoff | G09B 23/30 |
| 2017/0046583 A1* | 2/2017 | Rodriguez | G06T 7/246 |
| 2017/0048244 A1* | 2/2017 | Loughlin-McHugh | |
| | | | G06K 9/0061 |
| 2017/0069080 A1* | 3/2017 | Sezginer | G06T 7/001 |
| 2017/0079523 A1* | 3/2017 | Limon | A61B 3/032 |
| 2017/0099478 A1* | 4/2017 | Cambridge | G02B 27/0093 |
| 2017/0103281 A1* | 4/2017 | Amtrup | G06K 9/4671 |
| 2017/0115691 A1* | 4/2017 | Aurongzeb | G06F 1/1618 |
| 2017/0122837 A1* | 5/2017 | Mtauweg | G01M 13/021 |
| 2017/0123492 A1* | 5/2017 | Marggraff | G06F 3/0236 |
| 2017/0140227 A1* | 5/2017 | Takemura | G08G 1/16 |
| 2017/0146801 A1* | 5/2017 | Stempora | G06Q 10/063 |
| 2017/0147034 A1* | 5/2017 | Lanman | G06F 1/163 |
| 2017/0153698 A1* | 6/2017 | Bamidele | G09G 5/00 |
| 2017/0161506 A1* | 6/2017 | Gates | G06F 21/602 |
| 2017/0178375 A1* | 6/2017 | Benishti | G06K 9/4661 |
| 2017/0180712 A1* | 6/2017 | Ohashi | H04N 13/044 |
| 2017/0188023 A1* | 6/2017 | Brabenac | H04N 17/02 |
| 2017/0192502 A1* | 7/2017 | Dmitrieva | A61B 3/113 |
| 2017/0197113 A1* | 7/2017 | Robinson | A63B 24/0087 |
| 2017/0213377 A1* | 7/2017 | Torii | G06T 11/60 |
| 2017/0231490 A1* | 8/2017 | Toth | A61B 5/40 |
| | | | 600/558 |
| 2017/0235931 A1* | 8/2017 | Publicover | G06F 21/64 |
| 2017/0255814 A1* | 9/2017 | Kaehler | G06F 21/32 |
| 2017/0255823 A1* | 9/2017 | Abe | A61B 5/117 |
| 2017/0256192 A1* | 9/2017 | Knepper | G09G 3/2003 |
| 2017/0263192 A1* | 9/2017 | Luna | G09G 3/3406 |
| 2017/0269722 A1* | 9/2017 | Krishnakumar | G06F 3/03547 |
| 2017/0277268 A1* | 9/2017 | Ono | G06F 3/017 |
| 2017/0277500 A1* | 9/2017 | Ono | G09F 9/33 |
| 2017/0287215 A1* | 10/2017 | Lalonde | G06T 19/006 |
| 2017/0287446 A1* | 10/2017 | Young | G09G 5/391 |
| 2017/0289529 A1* | 10/2017 | Carollo | G02B 27/2207 |
| 2017/0290504 A1* | 10/2017 | Khaderi | A61B 3/0091 |
| 2017/0293356 A1* | 10/2017 | Khaderi | A63F 13/212 |
| 2017/0299878 A1* | 10/2017 | Scott | H04N 13/0033 |
| 2017/0311799 A1* | 11/2017 | Holt | A61B 3/0025 |
| 2017/0315613 A1* | 11/2017 | Fein | G06F 3/011 |
| 2017/0323299 A1* | 11/2017 | Davis | G06Q 20/40145 |
| 2017/0328733 A1* | 11/2017 | Gotoh | G01C 21/3661 |
| 2017/0337712 A1* | 11/2017 | Nakashima | H04N 13/0486 |
| 2017/0351485 A1* | 12/2017 | Kohler | G06F 3/165 |
| 2017/0351929 A1* | 12/2017 | Kim | G06K 9/00906 |
| 2017/0352162 A1* | 12/2017 | Ruan | G06T 7/60 |
| 2017/0357092 A1* | 12/2017 | Griffin | G02B 3/10 |
| 2017/0358141 A1* | 12/2017 | Stafford | G06F 3/0482 |
| 2017/0371162 A1* | 12/2017 | Makino | G02B 27/0172 |
| 2017/0372136 A1* | 12/2017 | Andorko | G06K 9/00617 |
| 2018/0003962 A1* | 1/2018 | Urey | G02B 27/0093 |
| 2018/0003966 A1* | 1/2018 | Kilcher | G02B 5/208 |
| 2018/0004286 A1* | 1/2018 | Chen | G06F 3/013 |
| 2018/0005040 A1* | 1/2018 | Babenko | G06K 9/00744 |
| 2018/0005077 A1* | 1/2018 | Wang | G06K 9/6277 |
| 2018/0007255 A1* | 1/2018 | Tang | H04N 5/23212 |
| 2018/0012007 A1* | 1/2018 | Kim | G06F 21/32 |
| 2018/0013995 A1* | 1/2018 | Mizushiro | H04N 9/3185 |
| 2018/0018349 A1* | 1/2018 | Liu | G06F 17/30256 |
| 2018/0033200 A1* | 2/2018 | Ligameri | G06F 3/04815 |
| 2018/0033203 A1* | 2/2018 | Ligameri | G06T 19/006 |
| 2018/0052513 A1* | 2/2018 | Le Gros | G02B 27/0093 |
| 2018/0065037 A1* | 3/2018 | Yamamoto | A63F 13/21 |
| 2018/0075820 A1* | 3/2018 | Hicks | G09G 5/363 |
| 2018/0088667 A1* | 3/2018 | Knorr | G06F 3/013 |
| 2018/0115673 A1* | 4/2018 | Yamasaki | H04N 1/00896 |
| 2018/0116528 A1* | 5/2018 | Tzvieli | A61B 5/01 |
| 2018/0116578 A1* | 5/2018 | Tzvieli | A61B 5/165 |
| 2018/0120572 A1* | 5/2018 | Watanabe | G06F 3/013 |
| 2018/0133504 A1* | 5/2018 | Malchano | A61B 5/16 |
| 2018/0133507 A1* | 5/2018 | Malchano | A61B 5/16 |
| 2018/0136486 A1* | 5/2018 | Macnamara | A61B 3/1015 |
| 2018/0139434 A1* | 5/2018 | Roe | H04N 13/15 |
| 2018/0144672 A1* | 5/2018 | Fujita | B60R 11/02 |
| 2018/0150387 A1* | 5/2018 | Kogan | G06F 9/455 |
| 2018/0157045 A1* | 6/2018 | Davami | G02B 27/017 |
| 2018/0167490 A1* | 6/2018 | Morton | H04L 67/34 |
| 2018/0173977 A1* | 6/2018 | Kim | G06K 9/0061 |
| 2018/0182142 A1* | 6/2018 | Lim | G06T 11/60 |
| 2018/0182307 A1* | 6/2018 | Tseng | G06F 3/011 |
| 2018/0189994 A1* | 7/2018 | Lawton | G02B 27/0101 |
| 2018/0197624 A1* | 7/2018 | Robaina | A61B 3/0041 |
| 2018/0199028 A1* | 7/2018 | Ratcliff | G06T 19/006 |
| 2018/0199876 A1* | 7/2018 | Liu | A61B 3/11 |
| 2018/0204058 A1* | 7/2018 | Yoo | G06K 9/00604 |
| 2018/0239131 A1* | 8/2018 | Cornelius | A61F 9/025 |
| 2018/0239955 A1* | 8/2018 | Rodriguez | G06K 9/0061 |
| 2018/0241988 A1* | 8/2018 | Zhou | H04N 21/21805 |
| 2018/0247119 A1* | 8/2018 | Ryan | A61B 3/112 |
| 2018/0254103 A1* | 9/2018 | Jung | G06N 3/088 |
| 2018/0271364 A1* | 9/2018 | Orlosky | A61B 3/113 |
| 2018/0274974 A1* | 9/2018 | Wang | G01J 1/00 |
| 2018/0276894 A1* | 9/2018 | Chang | G06T 19/006 |
| 2018/0277002 A1* | 9/2018 | Hergenroeder | G09B 5/06 |
| 2018/0277117 A1* | 9/2018 | Hergenroeder | G09B 19/04 |
| 2018/0278993 A1* | 9/2018 | Crisler | H04N 21/44218 |
| 2018/0279948 A1* | 10/2018 | Medberry | A61B 3/0008 |
| 2018/0286070 A1* | 10/2018 | Benedetto | G06T 7/62 |
| 2018/0286268 A1* | 10/2018 | Ni | G06F 3/011 |
| 2018/0309955 A1* | 10/2018 | Lawrence | H04N 19/00 |
| 2018/0314066 A1* | 11/2018 | Bell | G02B 27/0093 |
| 2018/0335625 A1* | 11/2018 | Chang | G09G 3/3406 |
| 2018/0338104 A1* | 11/2018 | Pines | G09G 5/00 |
| 2018/0365491 A1* | 12/2018 | Delaney | G06F 40/103 |
| 2018/0373326 A1* | 12/2018 | Gatson | G06F 3/013 |
| 2018/0374264 A1* | 12/2018 | Gatson | G01S 1/74 |
| 2018/0375660 A1* | 12/2018 | Yildiz | H04W 12/0608 |
| 2019/0019047 A1* | 1/2019 | Zhou | G06K 9/00912 |
| 2019/0028634 A1* | 1/2019 | Koehler | H04N 5/2256 |
| 2019/0042842 A1* | 2/2019 | Cavin | G06K 9/00617 |
| 2019/0050664 A1* | 2/2019 | Yang | G06F 3/012 |
| 2019/0060359 A1* | 2/2019 | Norviel | A61K 33/20 |
| 2019/0086668 A1* | 3/2019 | Ha | G02B 27/0172 |
| 2019/0094678 A1* | 3/2019 | Ameres | G09F 19/12 |
| 2019/0102706 A1* | 4/2019 | Frank | G06Q 10/063 |
| 2019/0107719 A1* | 4/2019 | Edwin | G02B 27/0172 |
| 2019/0114075 A1* | 4/2019 | Jung | G06F 3/04886 |
| 2019/0122642 A1* | 4/2019 | Morein | G09G 5/391 |
| 2019/0139574 A1* | 5/2019 | Ogawa | G11B 20/00007 |
| 2019/0146584 A1* | 5/2019 | Onuki | G06F 3/015 |
| 2019/0179423 A1* | 6/2019 | Rose | G02B 27/0172 |
| 2019/0222817 A1* | 7/2019 | Abou Shousha | H04N 9/646 |
| 2019/0223716 A1* | 7/2019 | Abou Shousha | G02B 27/0172 |
| 2019/0227327 A1* | 7/2019 | Abou Shousha | G02B 27/0179 |
| 2019/0235255 A1* | 8/2019 | Seibert | G02B 27/0179 |
| 2019/0243133 A1* | 8/2019 | Liao | G09G 3/342 |
| 2019/0271849 A1* | 9/2019 | Serdarevic | A61F 2/1451 |
| 2019/0278080 A1* | 9/2019 | Ishibashi | G02B 27/0093 |
| 2019/0279407 A1* | 9/2019 | McHugh | G06T 11/60 |
| 2019/0287309 A1* | 9/2019 | Samec | G06T 19/006 |
| 2019/0294261 A1* | 9/2019 | Lohse | G02B 27/017 |
| 2019/0318701 A1* | 10/2019 | Huang | G09G 3/3648 |
| 2019/0321583 A1* | 10/2019 | Poltorak | A61B 5/486 |
| 2020/0029802 A1* | 1/2020 | Lane | A61B 3/02 |
| 2020/0058256 A1* | 2/2020 | Seibert | G06F 1/163 |
| 2020/0064631 A1* | 2/2020 | Robbins | G06F 3/013 |
| 2020/0065584 A1* | 2/2020 | Iyer | G06T 7/70 |
| 2020/0074724 A1* | 3/2020 | Mathur | G02B 27/0172 |
| 2020/0074734 A1* | 3/2020 | Hamlin | G06T 7/20 |
| 2020/0082555 A1* | 3/2020 | Iyer | G06T 19/006 |
| 2020/0103654 A1* | 4/2020 | Cheng | G03B 21/00 |
| 2020/0103655 A1* | 4/2020 | Mainguet | G06F 3/017 |

(56) References Cited

U.S. PATENT DOCUMENTS

2020/0103967 A1* 4/2020 Bar-Zeev ............ G06F 3/04842
2020/0118456 A1* 4/2020 Breed ...................... G09B 7/07

* cited by examiner

HEADSET DISPLAY CONTROL BASED UPON A USER'S PUPIL STATE

FIELD

The present disclosure generally relates to Information Handling Systems (IHSs), and, more particularly, to systems and methods for display control based on pupil size in virtual, augmented, and mixed reality (xR) applications.

BACKGROUND

The goal of virtual reality (VR) is to immerse users in virtual environments. A conventional VR device obscures a user's real-world surroundings, such that only digitally-generated images remain visible. Those images are presented on a display such as, for example, an organic light-emitting diode (OLED) panel housed within a head-mounted device (HMD) or the like. In contrast with VR, augmented reality (AR) and mixed reality (MR) operate by overlaying digitally-generated content or entities (e.g., characters, text, hyperlinks, images, graphics, etc.) upon the user's physical surroundings. A typical AR/MR device includes a projection-based optical system that displays content on a translucent or transparent surface (e.g., plastic, glass, etc.) of an HMD, heads-up display (HUD), eyeglasses, or the like (collectively referred to as "headsets").

In some implementations, an xR (i.e., VR, AR, or MR) headset may include an Ambient Light Sensor (ALS) that measures the amount of ambient light—that is, the light outside of the xR headset—to automatically adjust or "correct" the brightness of the headset's display. The inventors hereof have determined, however, that traditional ALS-based techniques are ineffective in many day-to-day use cases, such as when a single light source is aimed towards the user's face, when light reaches the user from different angles (e.g., different light sources or highly reflective objects), or when the user is outdoors.

The inventors hereof have further recognized that different people have different sensitivity to light. In most computing systems that provide ALS-based brightness correction, users still manually adjust their displays' brightness to their individual tastes.

SUMMARY

Embodiments of systems and methods for display control based on pupil size in virtual, augmented, and mixed reality (xR) applications are described. In an illustrative, non-limiting embodiment, an xR headset may include: a body; a display coupled to the body; a camera coupled to the body; a controller coupled to the display; and a memory coupled to the controller, the memory comprising program instructions stored thereon that, upon execution, cause the controller to: identify, via the camera, a pupil state of a user wearing the xR headset; select a setting based upon the pupil state; and apply the setting to at least one of: (a) the display, or (b) an image shown to the user via the display.

The display may include at least one of: an optical projector, a monitor, or a handheld device. The camera may be directed toward an eye of the user, and it may include at least one of: an infrared camera, or a video camera. The pupil state may comprise a rate of change of a pupil size of a user's eye.

The setting may comprise at least one of: a size of the image, a position of the image, or a length of time during which the image is shown. Additionally or alternatively, the setting may comprise a priority of the image relative to other images in a given frame, where the image has a higher priority than at least one of the other images, and the program instructions, upon execution, further cause the controller to: abstain from showing the at least one of the other images to the user via the display.

The xR headset may comprise an Ambient Light Sensor (ALS), and the program instructions, upon execution, may further cause the controller to perform at least one of: the (a) the identify operation, (b) the select operation, or the (c) apply operation in response to the ALS indicating that a light condition in an environment occupied by the user has changed by a first threshold amount; or, after initially showing the image to the user, abstain from continuing to perform at least one of: (a) the identify operation, (b) the select operation, or (c) the apply operation with respect to at least one of: the image, or a subsequent image, in response to the ALS indicating that the light condition has not changed by a second threshold amount.

The program instructions, upon execution, may cause the controller to communicate at least one of: (a) the pupil state, or (b) the setting, to an IHS coupled to the xR headset, where the IHS is configured to modify an aspect of another display coupled to the IHS in response to the communication.

In some cases, the pupil state may comprise a pupil size. The setting may include a brightness of the display. The pupil size may be below a first threshold value, and, to apply the setting, the program instructions, upon execution, may further cause the controller to increase the brightness of the display. Additionally or alternatively, the pupil size may be above a second threshold value, and, to apply the setting, the program instructions, upon execution, may further cause the controller to decrease the brightness of the display.

The setting may include a color scheme, the color scheme may be selected from the group consisting of: grayscale, color, and true color; and, to apply the setting, the program instructions, upon execution, may further cause the controller to switch from a first color scheme to a second color scheme, the second color scheme designed to: (a) increase awareness of the user; or (b) reduce discomfort of the user.

In another illustrative, non-limiting embodiment, a method may implement one or more of the aforementioned operations. In yet another illustrative, non-limiting embodiment, a hardware memory storage device may have program instructions stored thereon that, upon execution by an IHS, cause the IHS to perform one or more of the aforementioned operations.

BRIEF DESCRIPTION OF THE DRAWINGS

The present invention(s) is/are illustrated by way of example and is/are not limited by the accompanying figures. Elements in the figures are illustrated for simplicity and clarity, and have not necessarily been drawn to scale.

DETAILED DESCRIPTION

Embodiments described herein provide systems and methods for display control based on pupil size in virtual, augmented, and mixed reality (collectively referred to as "xR") applications. These systems and methods are particularly useful in xR applications that employ head-mounted devices (HMDs), Heads-Up Displays (HUDs), eyeglasses, or the like (collectively referred to as "xR headsets" or simply "headsets").

In various implementations, inward-facing camera(s) may be mounted onto an xR headset. A user's pupil size responds to ambient light and to digitally-generated images provided by the xR headset. The inward-facing camera(s) may be configured to detect and/or to track the user's pupil state (e.g., size, rate of change, etc.), and the xR headset may employ that information to control aspects of its display, such as, for example: a brightness of an image, a sharpness of an image, a gamma correction, a color scheme of the image, a size of the image, a position of the image, a length of time during which the image is shown, a transparency or translucency of a headset polarizer integrated into the display, etc.

By uniquely rendering images based upon the user's current pupil size and/or rate of change, systems and methods described herein provide a natural and individualized user experience. In various implementations, pupil size information gathered by the inward-facing camera may be processed by the xR headset itself and/or by another computing system or information handling system (IHS) in wired or wireless communication with the xR headset. Additionally or alternatively, information gathered by the inward-facing camera may be used to change an aspect of another display coupled to an IHS, distinct from the xR headset.

Figure 1:
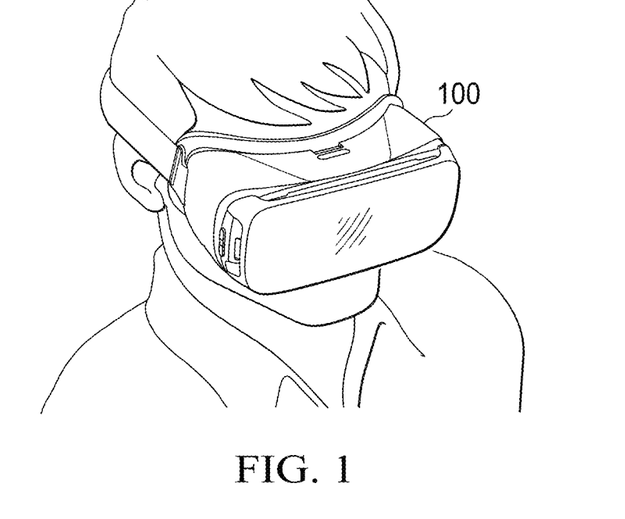
FIG. 1 shows a perspective view of a non-limiting example of a headset used in a virtual, augmented, or mixed reality (xR) application according to some embodiments
Figure 2:
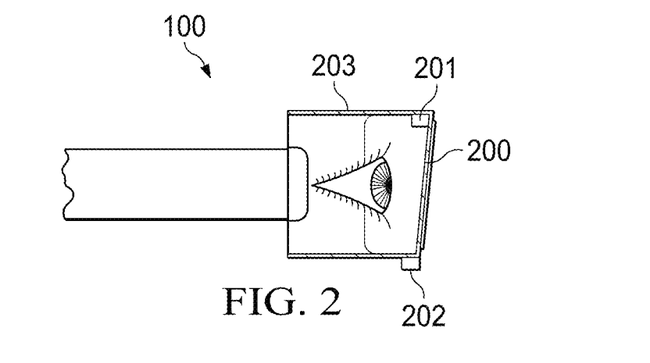
FIG. 2 shows a cross-sectional view of the xR headset according to some embodiments.

FIG. 1 illustrates an example of xR headset 100, and FIG. 2 is a cross-sectional view of xR headset 100 configured to implement display control techniques based upon a user's pupil size according to some embodiments.

As shown, a user wears xR headset 100 around their head and over their eyes, such that the user can see their physical environment via a see-through display system, glass, and/or lens 200 ("display") mounted on headset frame or body 203. In some cases, a layer of polarizing material may be incorporated into display 200 to control the amount of external light reaching the user's eyes. Moreover, xR headset 100 may include one or more transparent or translucent Organic Light-Emitting Diode (OLED) displays having one or more flexible sheets of organic electroluminescent material. Additionally or alternatively, transparent OLEDs may be replaced with an optical projector device aimed at a projection glass or the like.

In some cases, a first display portion may be disposed in front of the user's right eye, and a second display portion may be disposed in front of the user's left eye. Alternatively, a single display may be used for both eyes.

Display(s) 200 may show information in the form of digital entities (e.g., characters, text, hyperlinks, images, graphics, etc.) overlaying a visible, physical environment in the user's field of view. In some cases, these digital entities may be relevant to a physical object located within the environment and recognized by the xR headset using a learning machine algorithm implemented using a front-facing camera. Additionally or alternatively, display(s) 200 may completely immerse the user is a purely virtual, digital environment, such that, for practical purposes, the physical environment is no longer visible to the user.

xR headset 100 may include inward-facing camera 201 (e.g., an infrared or video camera) mounted onto headset body 203 and aimed at the user's eye. In other implementations, however, two inward-facing cameras may be used, one on each side of body 203, each inward-facing camera aimed at a respective eye.

xR headset 100 may also include ambient light sensor (ALS) and/or ALS integrated circuit (IC) 202 disposed outside of xR headset 100 and mounted onto headset body 203. Examples of ALS sensor 202 include photosensors or photodetectors (e.g., a p-n junction or the like) that convert light into electrical current, such that the output of ALS sensor 202 is a signal that indicates the amount of ambient light outside of xR headset 100.

In some implementations, ALS sensor 202 may provide a single composite brightness value. Additionally or alternatively, ALS sensor 202 may be a full-color sensor that breaks the light into individual RGB values. In some cases, ALS sensor 202 may be built into body 203 and covered by a transparent or translucent illumination window. Alternatively, ALS sensor 202 may be replaced by another camera aimed outwardly from xR headset 100.

Figure 3:
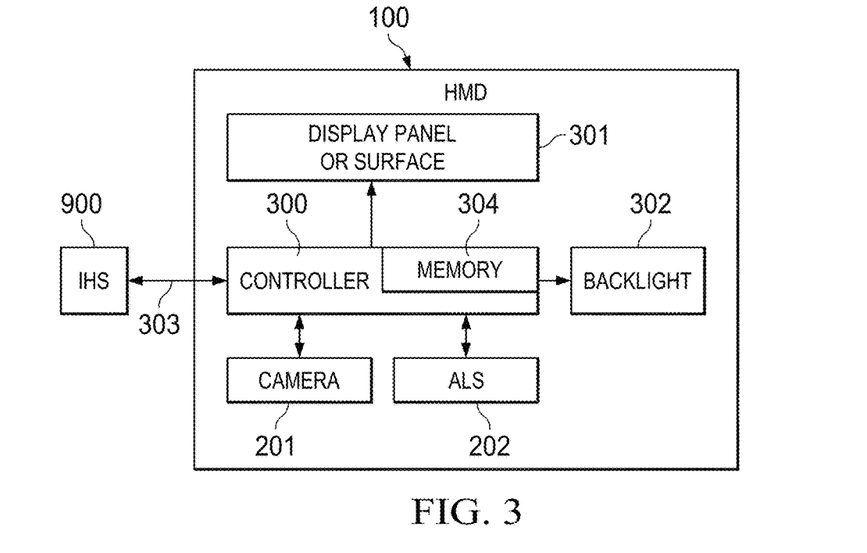
FIG. 3 is a block diagram of non-limiting examples of xR headset components according to some embodiments.

FIG. 3 illustrates an example of components of xR headset 100 according to some embodiments. As depicted, controller 300 includes hardware memory storage device 304 having program instructions stored thereon that, upon execution by controller 300, cause xR headset 100 to create and/or display an all-immersive virtual environment; and/or to overlay digitally-created content or images on panel or surface 301 (e.g., an LCD panel, an OLED film, a projection surface, etc.) in place of and/or in addition to the user's natural visual perception of the real-world.

As such, controller 300 drives panel or surface 301 and/or backlight 302 (e.g., an LED light) of display 200 in order to provide the user with a visual xR experience. Moreover, controller 300 may employ sensors (not shown) to implement a number of tracking techniques usable in the rendering of the xR images (e.g., the user's own location, head position, etc.), and/or to change one or more aspects of xR headset 101's display 102 and/or digitally-created content or images (e.g., relative size of other entities, perspective, field of view, etc.).

Moreover, controller 300 employs inward-facing camera 201 to gather pupil state information (e.g. size, rate of change, etc.), in some cases supplemented by ambient light information gathered by ALS sensor 202, to change one of more aspects of display 200 and/or digitally-created content or images.

In some implementations, controller 300 may communicate with external IHS 900 via wired or wireless connection (e.g., USB, Wi-Fi, Bluetooth, etc.) 303, which allows IHS 900 to change aspects of display 200 and/or of another display 908 using pupil state or size information gathered by inward-facing camera 201 in xR headset 100.

It should be noted FIG. 3 shows only portions of xR headset 100 that are relevant for understanding the systems and methods described herein. Yet, it also should be noted that, in various implementations, power and other components may be used. Moreover, in some cases, xR headset 100 may itself be an instance of an IHS, such that one or more elements of IHS 900 may be built onto body 203 of xR headset 100.

Figure 4:
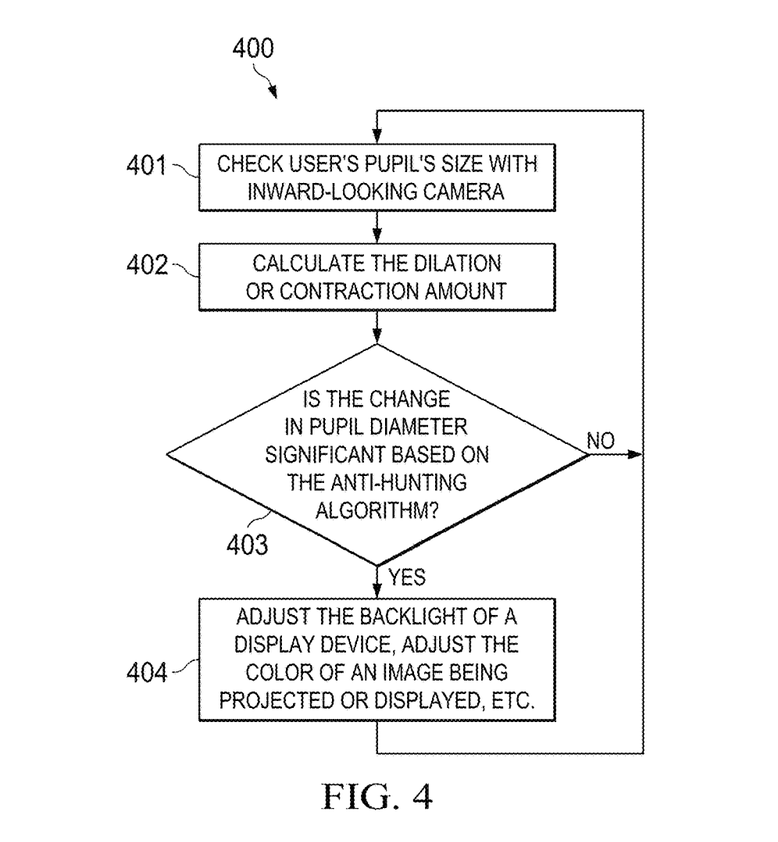
FIG. 4 is a flowchart of a non-limiting example of a method for display control based on pupil size in xR applications according to some embodiments.
Figure 5:
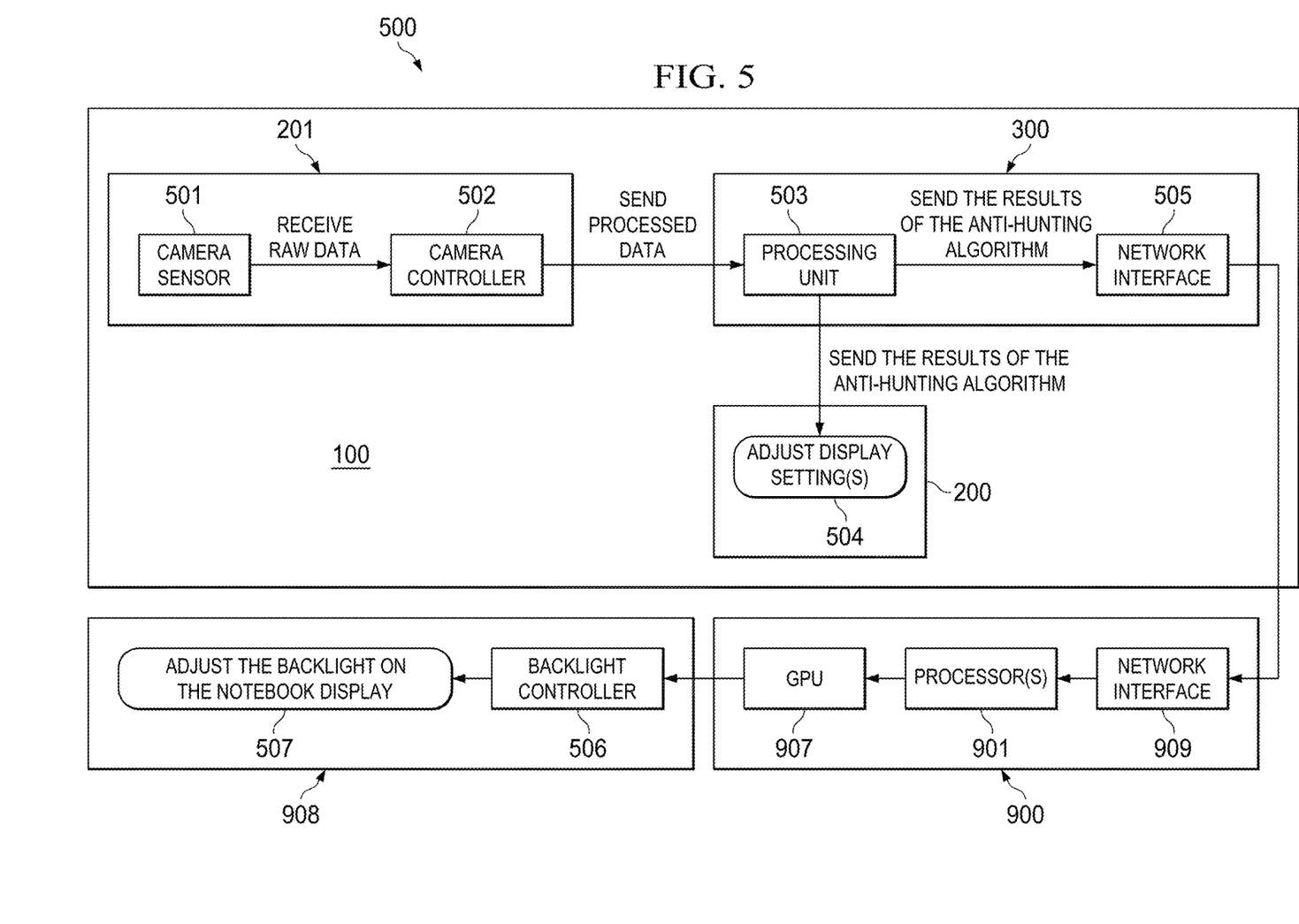
FIG. 5 is a block diagram of a non-limiting example of a system for display control based on pupil size in xR applications according to some embodiments.

FIG. 4 is a flowchart of an example of method 400 and FIG. 5 is a block diagram of an example of system 500 for display control based on pupil size in xR applications. In some embodiments, method 400 may be performed by system 500.

At block 401, controller 300 receives information from inward-facing camera 201 indicative of the user's pupil size. Generally, block 401 may identify the contribution to pupil size changes due to changes in the ambient light, apart from changes to the video/image being displayed. In some cases, block 401 may capture a comfortable pupil size for the user in different ambient light conditions and for different projected video settings, and it may store in memory 304 a comfortable range of pupil sizes for that user in that particular environment or situation, when the user is presented with a wide variety of images and types of images. This is especially useful in xR applications where there is no outside light, so that method 400 may mimic the user's regular daylight preferences and eye comfort in a closed xR environment.

Figure 8:
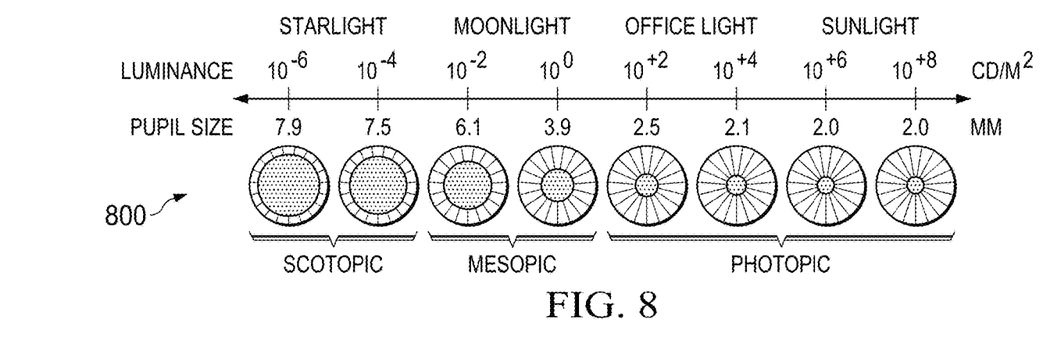
FIG. 8 is a chart of non-limiting examples of pupil size values and selectable thresholds according to some embodiments.

At block 402, controller 300 identifies a dilation or contraction of the user's pupil, as shown in chart 800. At block 403, if the magnitude of the change in pupil diameter is above a threshold value (that is, if the change in size is significant for a particular application), then at block 404 controller 300 adjusts an aspect of display 200 (and/or external display device 908) corresponding to the change in pupil diameter (e.g., by adjusting backlight 302 to increase or decrease the brightness of surface or panel 301, to increase or decrease the sharpness of an image, to change the gamma correction, to adjust a color scheme, a size of the image, a position of the image, a length of time during which the image is shown, to change the transparency or translucency of a polarizer coupled or integrated into the headset display, etc.). Otherwise, control returns to block 401.

In some implementations, the same threshold value may be employed, regardless of whether the user's pupil size is increasing (dilation) or decreasing (contraction). In other implementations, an anti-hunting algorithm may be employed to add hysteresis.

For example, if the user's pupil size increases by a first threshold amount (e.g., 1 mm) due to a decrease in ambient light, block 404 may decrease the brightness of panel or surface 301 (to match the decrease in ambient light) by applying a lower frequency Pulse-Width Modulation (PWM) signal to backlight 302. Then, if the pupil size decreases by a second threshold amount (e.g., 2 mm) due to an increase in ambient light, block 404 may increase the brightness of panel or surface 301 (to match the increase in ambient light) by a applying a higher frequency PWM signal to backlight 302. In yet other implementations, a timeout may be used at block 404 so that control does not return to block 401 until a certain amount of time has passed.

In short, if the pupil decreases when the user is going into a bright ambient light condition, then method 400 may increase the brightness of the display to compensate for it and/or to maintain the user's pupil's size in a comfortable range for that particular user in that particular environment, for example, as identified in block 401. Conversely, if the pupil size is increases when the user is going into a dark ambient light condition, then method 400 may decrease the brightness of the display and maintain the user's pupil's size in their comfortable range, again, as identified in block 401.

Turning to FIG. 5, camera or image sensor 501 sends raw data to camera controller 502, both part of inward-facing camera system 201 within xR headset 100. Camera controller 502 then sends the processed data to processing unit 503 of controller 300. Instructions stored in memory 304, when executed by processing unit 503 of controller 300, may implement method 400 of FIG. 4 to evaluate the results of the anti-hunting algorithm and to adjust one or more settings or characteristics 504 of display 200 accordingly.

At least a portion of the information used by processing unit 503 to control display 200 is provided to IHS 900 using network interface 505 of controller 300 in wired or wireless communication with another network interface 909 of IHS 900. When the information reaches GPU 907 through processor(s) 901, GPU 907 may control backlight 506 of another display 908 coupled to IHS 900.

In some cases, processing unit 503 may increase the brightness of display 200 in xR headset 100 by a given amount, for example, and GPU 907 may increase the brightness of display 908 by that same amount. In other cases, processing unit 503 may increase the brightness of display 200 in xR headset 100 by a given amount, and GPU 907 may increase the brightness of display 908 by a different amount. In other cases, processing unit 503 may increase the brightness of display 200 in xR headset 100, and GPU 907 may reduce the brightness of display 908. Conversely, processing unit 503 may decrease the brightness of display 200 in xR headset 100, and GPU 907 may increase the brightness of display 908—all in response to changes in the user's pupil size as gathered by inward-facing camera 201.

Figure 6:
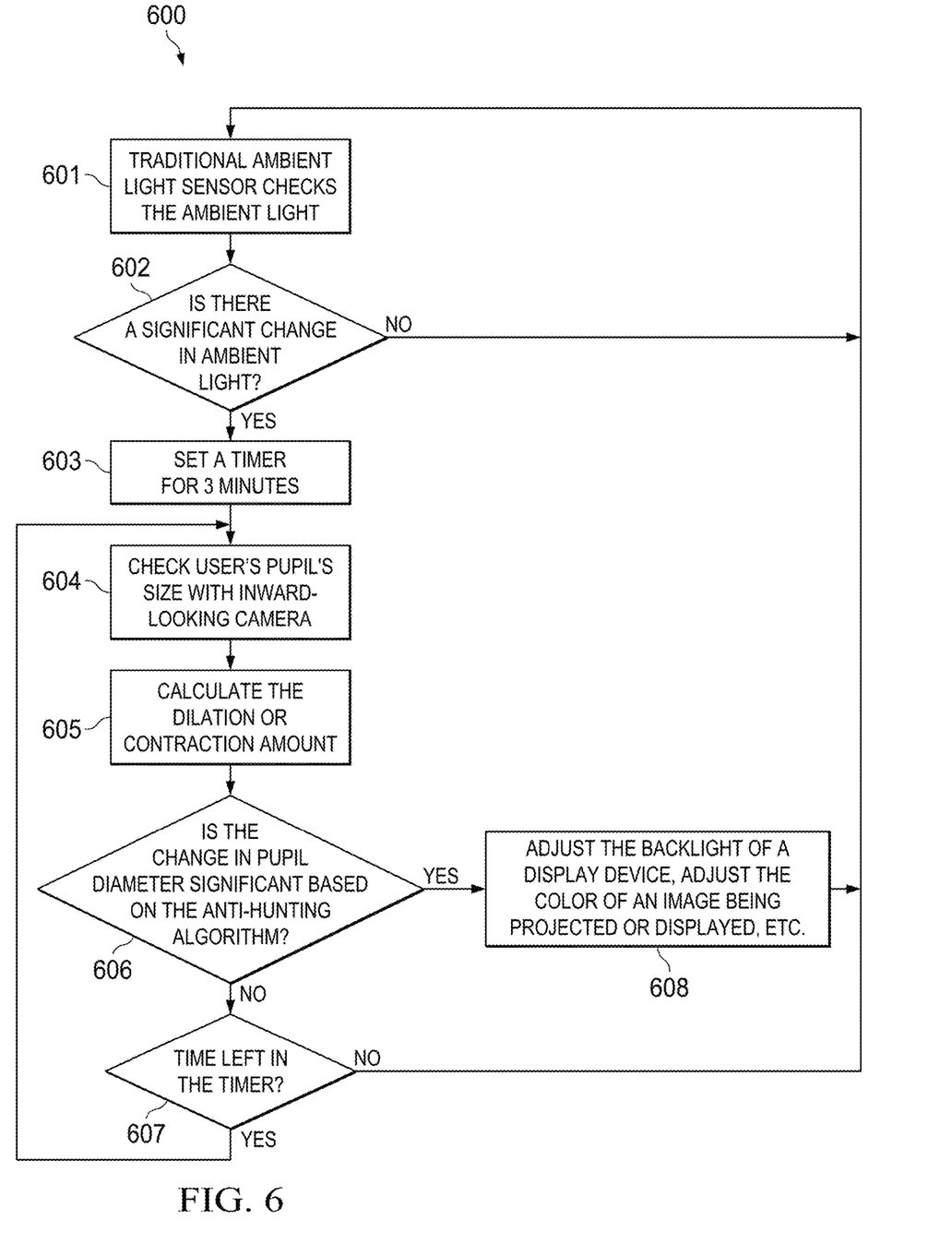
FIG. 6 is a flowchart of a non-limiting example of another method for display control based on pupil size in xR applications according to some embodiments.
Figure 7:
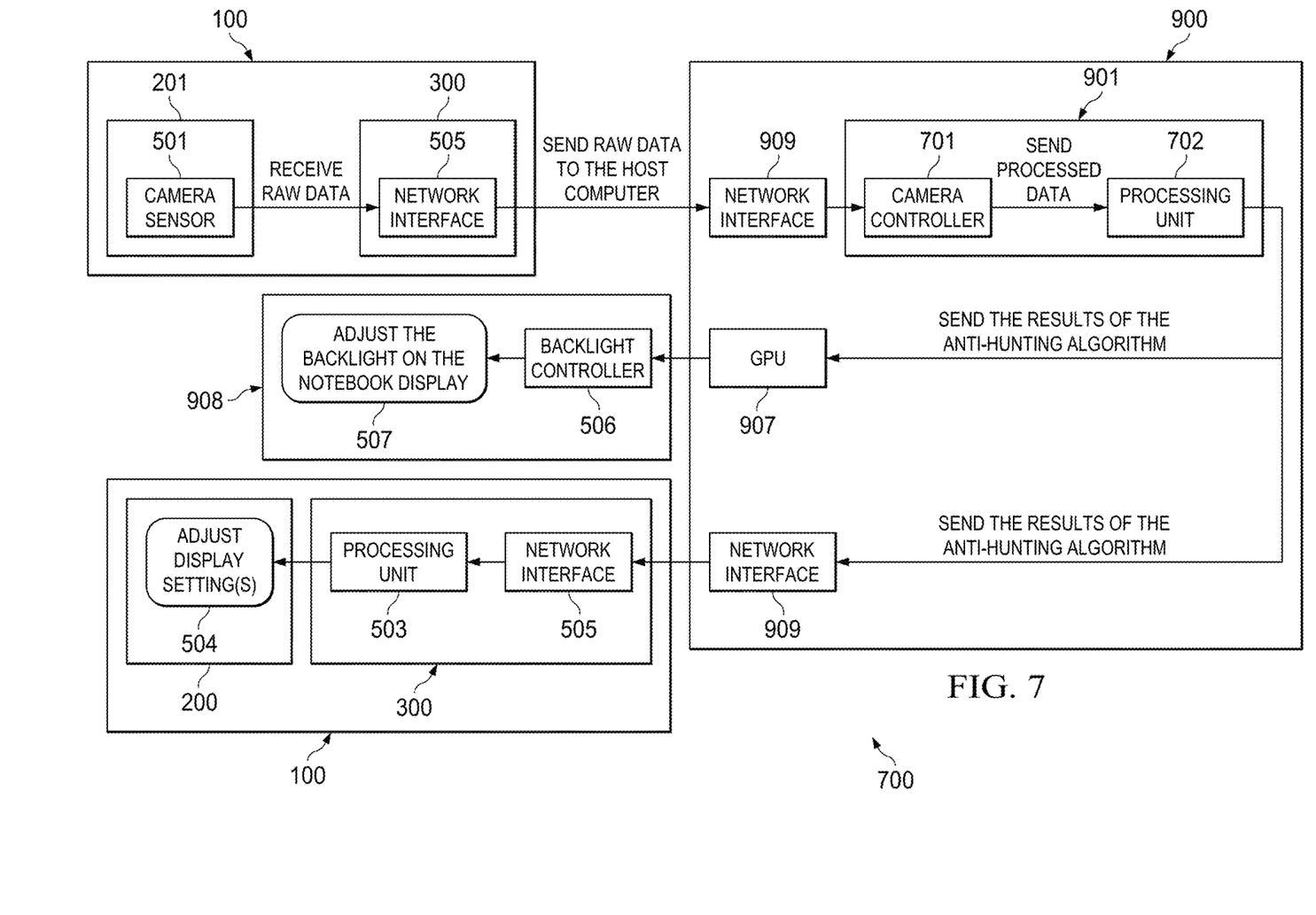
FIG. 7 is a block diagram of a non-limiting example of another system for display control based on pupil size in xR applications according to some embodiments.

FIG. 6 is a flowchart of an example of another method 600 and FIG. 7 is a block diagram of an example of another system 700 for display control based on pupil size in xR applications. In some embodiments, method 600 may be performed by system 700.

At block 601 of method 600, controller 300 receives information from ALS sensor 202 and, at block 602, controller determines whether there has been a change in ambient light above a selected threshold value (e.g., $10^2$ in $cd/m^2$). Otherwise, control returns to block 601. At block 603, a timer is set (e.g., 3 minutes). At block 604, controller 300 receives information from inward-facing camera 201 indicative of the user's pupil size. At block 605, controller 300 identifies a dilation or contraction of the user's pupil, as shown in chart 800.

At block 606, if the change in pupil diameter is above a selected threshold value, then at block 608 controller 300 adjusts an aspect of display 200 corresponding to the change in pupil diameter (e.g., by adjusting backlight 302 to increase or decrease the brightness of surface or panel 301, to adjust a color scheme, a size of the image, a position of the image, a length of time during which the image is shown, etc.). Otherwise, at block 607, if the timer of block 603 has expired, control returns to block 601. If not, method 600 returns to block 604.

In FIG. 7, camera or image sensor 501 of camera 201 sends raw data to network interface 505 of controller 300 of xR headset 100, which in turn sends that raw data to network interface 909 of IHS 900 to offload at least part of the processing to processor(s) 901. As such, camera controller 701 sends processed data to processing unit 702 of processor(s) 901, which may be configured to execute instructions configured to implement method 600 of FIG. 6.

Particularly, processing unit 702 sends the results of an anti-hunting algorithm to GPU 907 of IHS 900, and also to xR headset 100's processing unit 503 within controller 300 using network interfaces 505 and 909. When the information reaches GPU 907 through processor(s) 901, GPU 907 may control backlight 506 of another display 908 of IHS 900. And, similarly as above, processing unit 503 of controller 300 may increase or decrease the brightness of surface or panel 301.

FIG. 8 is a chart of examples of pupil size values and selectable thresholds 800 for implementing headset display control based upon a user's pupil size according to some embodiments. Pupil size or diameter can vary between 7.9 to 2 mm in direct proportion to changes in luminance between $10^{-4}$ to $10^8$ $cd/m^2$. In some cases, pupil size may be quantized into "buckets" as scotopic, mesopic, and photopic, whereas luminance may be quantized as starlight, moonlight, office light, or sunlight. These quantized values may be used to select threshold values of pupil diameter and corresponding display brightness or luminance adjustments and hysteresis.

As noted above, in addition to brightness adjustments to display 200, other changes may be made as a function of pupil size or its rate of change, such as adjusting a color scheme, a size of an image, a position of the image, and/or a length of time during which the image is shown. In some applications (e.g., AR), it may be important to be able to control the image rendering in a way to accommodate "close-to-real" images to provide natural usage and "sticking-out" images to attract user attention without disturbing user's eye sight.

For example, if changes in pupil size indicate a change in user's cognitive load (e.g., pupil size changes frequently as the user enter and exists an indoor environment, watches content via xR headset 100 that has high dynamic range, etc.), one or more of the digitally-generated entities may become more or less important to the user.

For instance, each piece of content to be overlaid on display panel or surface 301 may be assigned a different priority value. In situations where user's cognitive load appears to increase (pupil size changes rapidly above a threshold rate-of-change amount), high-priority information may be visually emphasized: larger size or font, different color scheme, blinking effect, positioning in the center of display 200. Meanwhile, other content overlaid on display panel or surface 301 that has a smaller priority value may be visually deemphasized: smaller size or font, from color to grayscale portion of the display, positioning in the corner of display 200, not displayed at all, etc.

In some cases, learning algorithms may be implemented such that changes to display 200 are designed to increase awareness of the user. In other cases, changes to display 200 are designed to reduce discomfort. Particularly, the diameter of the user's pupils may not match the expected diameter for the current degree of brightness of display 200. Expected diameters may be derived based upon the user's prior history of reacting to that same or comparative level or brightness or level of cognitive activity.

In some cases, the rate of change of the user's pupil size may indicate that the user is paying more attention to the outdoor, real-world environment than to xR content displayed by a headset. Particularly, an xR headset may be showing content of importance for a particular situation or task, such as, for example, a safety concern or building instructions provided to a manufacturing worker wearing the headset during in the production line.

If the change in pupil size for the worker is outside the response expected for that xR content—e.g., the change in pupil size is slower than expected, for example, based on prior user response to that content during a training or previous operation—the headset may infer that the worker is not paying sufficient attention to the xR content but rather is distracted by the real world, and it may change the display of the xR content (e.g., increase brightness, re-center the content on the screen, making the content larger, etc.) to draw the worker's attention to that information.

For instance, a given operation in the manufacturing line may require that the user read or accept instructions or warnings before initiating that operation. In that case, the xR headset may act upon the display's polarizing layer to darken or block the outside world and draw the user's attention to the xR content displayed by the headset.

Conversely, the rate of change of the user's pupil size may indicate that the worker is paying more attention to the xR content produced by the xR headset than to the real-world environment, in a situation where the user should be paying more attention to the environment.

If the change in pupil size for the worker is outside the response expected for that environment—e.g., the change in size is faster than expected, for example, based on prior user response to that environment during a training or previous operation while the ambient light level stays the same—the headset may infer that the worker is not paying sufficient attention to the real world but instead is distracted by the xR content, and it may change the display of the xR content (e.g., decrease brightness, moving the content off-center on the screen, making the content smaller, abstaining from displaying one or more images etc.) to direct the worker's attention away from the xR content.

In yet other cases, the level of attention or distraction of the user wearing the headset, as determined by their pupil size or rate of change, may be used to activate or modify parts of an application being executed by the xR headset and/or IHS. For example, if the application is a video game, lack or excess of user's attention may trigger a corresponding increase or decrease in the intensity of gameplay or graphics, or it may change game elements made available to the user (e.g., attention-based rewards, access to different playing levels or game items, etc.).

Figure 9:
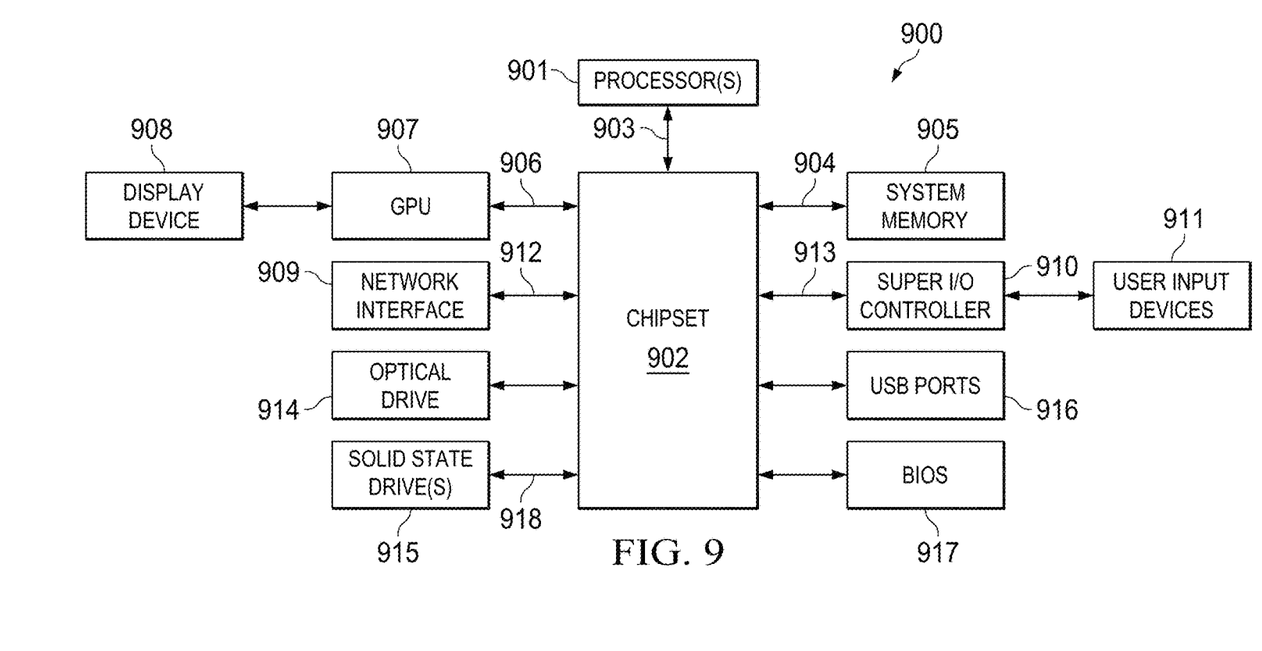
FIG. 9 is a block diagram of non-limiting examples of information handling system (IHS) components according to some embodiments.

FIG. 9 is a block diagram of IHS 900 configured to implement display control based on pupil size in xR applications according to some embodiments. In some cases, xR headset 100 may include IHS 900 or component(s) thereof. Additionally or alternatively, IHS 900 may be used as an external device in wired or wireless communication with xR headset 100, as discussed in FIGS. 3, 5, and 7.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory.

Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components. An example of an IHS is described in more detail below.

As shown in the implementation of FIG. 9, IHS 900 may include one or more processors 901. In various embodiments, IHS 900 may be a single-processor system including one processor 901, or a multi-processor system including two or more processors 901. Processor(s) 901 may include any processor capable of executing program instructions, such as any general-purpose or embedded processors implementing any of a variety of Instruction Set Architectures (ISAs).

IHS 900 includes chipset 902 that may include one or more integrated circuits that are connect to processor(s) 901. In certain embodiments, chipset 902 may utilize a QPI (QuickPath Interconnect) bus 903 for communicating with the processor(s) 901. Chipset 902 provides the processor(s) 901 with access to a variety of resources. For instance, chipset 902 provides access to system memory 905 over memory bus 904. System memory 905 may be configured to store program instructions and/or data accessible by processors(s) 901. In various embodiments, system memory 905 may be implemented using any suitable memory technology, such as static RAM (SRAM), dynamic RAM (DRAM) or nonvolatile/Flash-type memory.

Chipset 902 may also provide access to Graphics Processing Unit (GPU) 907. In certain embodiments, graphics processor 907 may be comprised within one or more video or graphics cards that have been installed as components of the IHS 900. Graphics processor 907 may be coupled to the chipset 902 via a graphics bus 906 such as provided by an AGP (Accelerated Graphics Port) bus or a PCIe (Peripheral Component Interconnect Express) bus. In certain embodiments, a GPU 907 generates display signals and provides them to HIVID device 100 (or any other display device 908).

In certain embodiments, chipset 902 may also provide access to one or more user input devices 911. In such embodiments, chipset 902 may be coupled to a super I/O controller 910 that provides interfaces for a variety of user input devices 911, in particular lower bandwidth and low data rate devices. For instance, super I/O controller 910 may provide access to a keyboard and mouse or other peripheral input devices. In certain embodiments, super I/O controller 910 may be used to interface with coupled user input devices 911 such as keypads, biometric scanning devices, and voice or optical recognition devices. These I/O devices may interface with super I/O controller 910 through wired or wireless connections. In certain embodiments, chipset 902 may be coupled to the super I/O controller 910 via a Low Pin Count (LPC) bus 913.

Other resources may also be coupled to the processor(s) 901 of the IHS 900 through the chipset 902. In certain embodiments, chipset 902 may be coupled to a network interface 909, such as provided by a Network Interface Controller (NIC) that is coupled to IHS 900. In certain embodiments, the network interface 909 may be coupled to the chipset 902 via a PCIe bus 912. According to various embodiments, network interface 909 may also support communication over various wired and/or wireless networks and protocols (e.g., Wi-Fi, Bluetooth, etc.). In certain embodiments, the chipset 902 may also provide access to one or more Universal Serial Bus (USB) ports 916.

Chipset 902 also provides access to one or more solid state storage devices 915 using PCIe bus interface connection 918. In certain embodiments, chipset 902 may also provide access to other types of storage devices. For instance, in addition to the solid state storage device 915, an IHS 900 may also utilize one or more magnetic disk storage devices, or other types of the storage devices such as an optical drive or a removable-media drive. In various embodiments, the solid state storage device 915 may be integral to the IHS 900, or may be located remotely from the IHS 900.

Upon powering or restarting IHS 900, processor(s) 901 may utilize instructions stored in Basic Input/Output System (BIOS) or Unified Extensible Firmware Interface (UEFI) chip 917 to initialize and test hardware components coupled to IHS 900 and to load an Operating System (OS) for use by IHS 900. Generally speaking, BIOS 917 provides an abstraction layer that allows the OS to interface with certain hardware components that utilized by IHS 900. It is through this hardware abstraction layer that software executed by the processor(s) 901 of IHS 900 is able to interface with I/O devices that coupled to IHS 900.

In various embodiments, IHS 900 may not include each of the components shown in FIG. 9. Additionally or alternatively, IHS 900 may include various components in addition to those that are shown. Furthermore, some components that are represented as separate components in FIG. 9 may, in some embodiments, be integrated with other components. For example, in various implementations, all or a portion of the functionality provided by the illustrated components may instead be provided by components integrated into the one or more processor(s) 901 as a system-on-a-chip (SOC) or the like.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A headset, comprising:
   a body;
   a display coupled to the body;
   a camera coupled to the body;
   a controller coupled to the display; and
   a memory coupled to the controller, the memory comprising program instructions stored thereon that, upon execution, cause the controller to:
      identify, via the camera, a rate of change of pupil size of a user wearing the headset;
      select a setting based upon the rate of change of pupil size, wherein the setting comprises a priority of an image relative to other images in a given frame, wherein the image has a higher priority than at least one of the other images, and wherein the program instructions, upon execution, further cause the controller to:
         abstain from showing the at least one of the other images to the user via the display; and
      apply the setting to the image shown to the user via the display, wherein:
         in response to the rate of change of pupil size being slower than a rate detected during a prior training operation where the image was shown, the setting is configured to direct the user's attention toward the image and away from the real world outside of the headset; and
         in response to the rate of change of pupil size being faster than a rate detected during the prior training operation where the image was shown, the setting is configured to direct the user's attention away from the image and toward the real world outside of the headset.

2. The headset of claim 1, wherein the display includes at least one of: an optical projector, a monitor, or a handheld device.

3. The headset of claim 1, wherein the camera is directed toward an eye of the user, and wherein the camera includes at least one of: an infrared camera, or a video camera.

4. The headset of claim 1, wherein the setting comprises at least one of: a size of the image, a position of the image, or a length of time during which the image is shown.

5. The headset of claim 1, wherein the headset further comprises an Ambient Light Sensor (ALS), and wherein the program instructions, upon execution, further cause the controller to:
   after initially showing the image to the user, abstain from continuing to perform at least one of: (a) the identify operation, (b) the select operation, or (c) the apply operation with respect to at least one of: the image, or a subsequent image, in response to the ALS indicating that the light condition has not changed by a threshold amount.

6. The headset of claim 1, wherein the program instructions, upon execution, further cause the controller to communicate the setting to an Information Handling System (IHS) coupled to the headset, and wherein the IHS is configured to apply the setting to another display distinct from the headset.

7. The headset of claim 1, wherein the setting comprises a brightness of the display, and wherein: (a) the pupil size is below a first threshold value, and, to apply the setting, the program instructions, upon execution, further cause the controller to increase the brightness of the display; or (b) the pupil size is above a second threshold value, and, to apply the setting, the program instructions, upon execution, further cause the controller to decrease the brightness of the display.

8. The headset of claim 1, wherein the setting comprises a color scheme, wherein the color scheme is selected from the group consisting of: grayscale or color, and wherein, to apply the setting, the program instructions, upon execution, further cause the controller to switch from a first color scheme to a second color scheme, the second color scheme designed to: (a) increase awareness of the user; or (b) reduce discomfort of the user.

9. A method, comprising:
   identifying, via a camera coupled to a headset, a rate of change of pupil size of a user wearing the headset;
   selecting a setting based upon the rate of change of pupil size, wherein the setting comprises a priority of an image relative to other images in a given frame, wherein the image has a higher priority than at least one of the other images, and wherein the method, upon execution, further causes to:
      abstain from showing the at least one of the other images to the user via the display; and
   applying the setting to the image shown to the user via a display coupled to the headset, wherein:
      in response to the rate of change of pupil size being slower than a rate detected during a prior training operation where the image was shown, the setting is configured to direct the user's attention toward the image and away from the real world outside of the headset, and
      in response to the rate of change of pupil size being faster than a rate detected during the prior training operation where the image was shown, the setting is configured to direct the user's attention away from the image and toward the real world outside of the headset.

10. The method of claim 9, wherein the setting comprises at least one of: a size of the image, a position of the image, or a length of time during which the image is shown.

11. The method of claim 9, further comprising:
    after initially showing the image to the user, abstaining from continuing to perform at least one of: (a) the identifying operation, (b) the selecting operation, or (c) the applying operation with respect to at least one of: the image, or a subsequent image, in response to an Ambient Light Sensor (ALS) coupled to the headset indicating that the light condition has not changed by a threshold amount.

12. The method of claim 9, wherein the setting comprises a brightness of the display, and wherein: (a) the pupil size is below a first threshold value, and wherein applying the setting further comprises increasing the brightness of the display; or (b) the pupil size is above a second threshold value, and wherein applying the setting further comprises decreasing the brightness of the display.

13. The method of claim 9, wherein the setting comprises a color scheme, wherein the color scheme is selected from the group consisting of: grayscale or color, and wherein applying the setting further comprises switching from a first color scheme to a second color scheme, the second color scheme designed to: (a) increase awareness of the user; or (b) reduce discomfort of the user.

14. A memory storage device having program instructions stored thereon that, upon execution by one or more processors of a headset, cause the headset to:
- identify, via a camera coupled to a headset, a rate of change of pupil size of a user wearing the headset;
- select a setting based upon the rate of change of pupil size, wherein the setting comprises a priority of an image relative to other images in a given frame, wherein the image has a higher priority than at least one of the other images, and wherein the program instructions, upon execution, further cause the headset to:
  - abstain from showing the at least one of the other images to the user via the display; and
- apply the setting to the image shown to the user via a display coupled to the headset, wherein:
  - in response to the rate of change of pupil size being slower than a rate detected during a prior training operation where the image was shown, the setting is configured to direct the user's attention toward the image and away from the real world outside of the headset, and
  - in response to the rate of change of pupil size being faster than a rate detected during the prior training operation where the image was shown, the setting is configured to direct the user's attention away from the image and toward the real world outside of the headset.

15. The memory storage device of claim 14, wherein the setting comprises at least one of: a size of the image, a position of the image, or a length of time during which the image is shown.

16. The memory storage device of claim 14, wherein the setting comprises a brightness of the display, and wherein: (a) the pupil size is below a first threshold value, and wherein, to apply the setting, the program instructions, upon execution, further cause the headset to increase the brightness of the display; or (b) the pupil size is above a second threshold value, and wherein applying the setting further comprises decreasing the brightness of the display.

17. The memory storage device of claim 14, wherein the setting comprises a color scheme, wherein the color scheme is selected from the group consisting of: grayscale or color, and wherein, to apply the setting, the program instructions, upon execution, further cause the headset to switch from a first color scheme to a second color scheme, the second color scheme designed to: (a) increase awareness of the user; or (b) reduce discomfort of the user.

* * * * *